Oct. 4, 1927.

W. L. ROPER 1,644,037

RADIUS ROD HOLDER

Filed Aug. 13, 1926

Walter L. Roper

Inventor

By C. A. Snow & Co.

Attorneys.

Patented Oct. 4, 1927.

1,644,037

UNITED STATES PATENT OFFICE.

WALTER L. ROPER, OF MAPLESVILLE, ALABAMA.

RADIUS-ROD HOLDER.

Application filed August 13, 1926. Serial No. 129,029.

This invention relates to a holder for the radius rod of an automobile, one of the objects being to provide a device of this character in the form of a resilient or spring hanger for engagement with the front axle and the end of the radius rod so as to hold the rod against rattling should the retaining nut work loose and prevent the rod from falling should the nut become completely detached.

A further object is to provide a holder of this type which can be easily applied without requiring the services of a skilled mechanic.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Referring to the figures by characters of reference A designates the front axle of an automobile through which are extended bolts B constituting the lower portions of posts P to which the front spring S of the automobile is connected in the usual or any preferred manner. The forwardly diverging arms of a radius rod have been indicated at R and as is the practice these arms are provided with eyes E at their forward ends adapted to be mounted on the lower end portions of the bolts B and to be held positioned thereon by nuts N.

Figure 3:
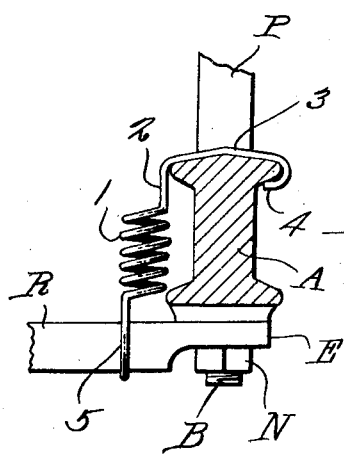
Figure 3 is a section on line 3—3, Figure 2.

The structure constituting the present invention includes a coiled spring 1 provided, at its upper end, with an arm 2 having a laterally extending yoke 3 adapted to straddle the top portion of the axle A, the free end portion of the yoke having an inturned finger 4 for engaging under the top flange of the axle as shown particularly in Figure 3. The other end of the spring is provided with a depending hook 5 adapted to extend under and constantly pull upwardly upon the adjacent portion of the radius rod R. When the spring is properly positioned on the axle and in engagement with the radius rod it exerts a constant upward pull upon the radius rod so as to hold it firmly against the axle. Consequently, should the nut N become loose, the radius rod would be prevented from rattling and if the nut should be lost, the holder would prevent the radius rod from becoming detached.

Figure 1:
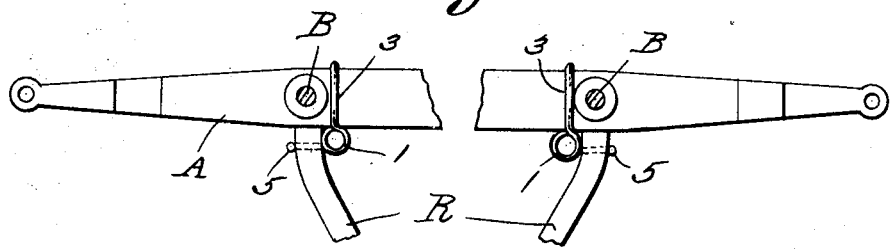
Figure 1 is a plan view of a portion of the front axle of an automobile showing the present improvements combined therewith and with the front ends of a radius rod, the post for connection to the front spring of the vehicle being shown in section.
Figure 2:
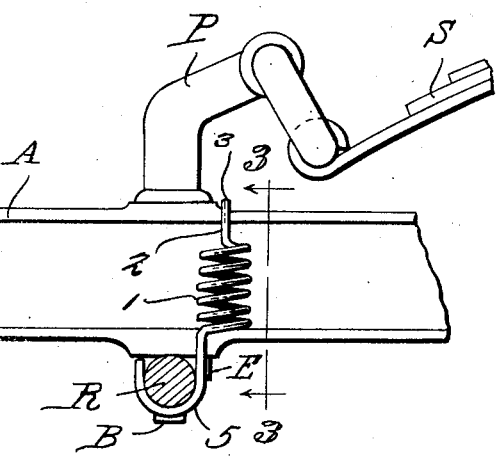
Figure 2 is an elevation of a portion of the axle, the holder being shown in position thereon and in engagement with a radius rod shown in section.

It is to be understood of course that two of these holders are provided, one for each arm of the radius rod, each pair of holders including a "right" and a "left" as shown particularly in Figure 1.

What is claimed is:

The combination with an axle, a bolt depending therefrom, and a radius rod detachably secured upon the bolt, of a resilient support for the rod, said support including a spring and oppositely extending means carried by the spring for engaging respectively the top of the axle and the bottom of the rod, said means being held in engagement with the axle and rod solely by friction due to the action of the spring.

In testimony that I claim the foregoing as my own, I have hereto affixed my signature.

WALTER L. ROPER.